(12) United States Patent
Pagliaro et al.

(10) Patent No.: US 12,132,363 B2
(45) Date of Patent: Oct. 29, 2024

(54) SELF-STARTING RELUCTANCE MOTOR

(71) Applicant: MOTOVARIO S.P.A., Formigine (IT)

(72) Inventors: Davide Pagliaro, Modena (IT); Antonio Scozzafava, Calderara di Reno (IT)

(73) Assignee: MOTOVARIO S.P.A. (IT)

( * ) Notice: Subject to any disclaimer, the term of this patent is extended or adjusted under 35 U.S.C. 154(b) by 183 days.

(21) Appl. No.: 17/910,260

(22) PCT Filed: Mar. 17, 2021

(86) PCT No.: PCT/IB2021/052210
§ 371 (c)(1),
(2) Date: Sep. 8, 2022

(87) PCT Pub. No.: WO2021/191741
PCT Pub. Date: Sep. 30, 2021

(65) Prior Publication Data
US 2023/0120904 A1    Apr. 20, 2023

(30) Foreign Application Priority Data

Mar. 23, 2020   (IT) .................. 102020000006052

(51) Int. Cl.
*H02K 19/14*   (2006.01)
*H02K 19/10*   (2006.01)

(52) U.S. Cl.
CPC ........... *H02K 19/14* (2013.01); *H02K 19/103* (2013.01)

(58) Field of Classification Search
CPC ............................ H02K 19/103; H02K 19/14
USPC ........................................................ 310/211
See application file for complete search history.

(56) References Cited

U.S. PATENT DOCUMENTS

| | | | |
|---|---|---|---|
| 5,831,367 A | 11/1998 | Fei et al. | |
| 10,205,358 B2* | 2/2019 | Hao | H02K 1/2766 |
| 10,742,080 B2* | 8/2020 | Hsu | H02K 3/12 |
| 2007/0170803 A1* | 7/2007 | Yabe | H02K 7/14 |
| | | | 310/216.071 |

(Continued)

FOREIGN PATENT DOCUMENTS

| | | |
|---|---|---|
| EP | 3288160 A1 | 2/2018 |
| WO | 2008111775 A2 | 9/2008 |
| WO | 2018083639 A1 | 5/2018 |

OTHER PUBLICATIONS

International Search Report and Written Opinion dated Apr. 7, 2021 from counterpart International Application No. PCT/IB2021/052210.

*Primary Examiner* — Rashad H Johnson
(74) *Attorney, Agent, or Firm* — Endurance Law Group PLC (57) ABSTRACT

A rotor including: a drive shaft rotating about an axis of rotation, a plurality of annular rotor plates, identical to each other, mounted on the drive shaft, superposed along the axis of rotation and including a plurality of openings, a pair of closing plates which are located at the ends of said plurality of rotor plates, a plurality of bars, passing through at least part of said plurality of openings of the plurality di rotor plates, a pair of short-circuit rings located a the ends of said plurality of bars and wherein an active ratio between a first area occupied by the plurality of openings and a total area of the rotor plate is greater than or equal to 0.30, that is, $R1=A1/AT \geq 0.30$.

15 Claims, 5 Drawing Sheets

(56) References Cited

U.S. PATENT DOCUMENTS

| | | | |
|---|---|---|---|
| 2009/0224624 A1* | 9/2009 | Kumar | H02K 1/246 310/156.53 |
| 2010/0148613 A1* | 6/2010 | Nam | H02K 21/46 310/156.83 |
| 2010/0187935 A1* | 7/2010 | Nam | H02K 21/46 310/156.83 |
| 2013/0015727 A1* | 1/2013 | Iki | H02K 1/246 310/49.43 |
| 2014/0117791 A1 | 5/2014 | Fiseni et al. | |
| 2015/0084471 A1* | 3/2015 | Huh | H02K 1/246 310/156.78 |
| 2015/0372577 A1* | 12/2015 | Haussmann | H02K 15/0012 29/598 |
| 2016/0049835 A1* | 2/2016 | Fukumoto | H02K 19/103 310/46 |
| 2016/0308408 A1* | 10/2016 | Ronchetto | H02K 1/22 |
| 2016/0329787 A1* | 11/2016 | Ito | H02K 1/246 |
| 2017/0012481 A1* | 1/2017 | Ballweg | H02K 1/22 |
| 2017/0222505 A1* | 8/2017 | Janjic | H02K 1/246 |
| 2018/0083500 A1* | 3/2018 | Buttner et al. | H02K 15/0012 |
| 2018/0138765 A1* | 5/2018 | Filipeti | H02K 21/14 |
| 2018/0152066 A1* | 5/2018 | Li | H02K 1/2766 |
| 2018/0198356 A1* | 7/2018 | Gieras | H02K 19/14 |
| 2018/0226848 A1* | 8/2018 | Kolehmainen | H02K 19/14 |
| 2019/0081522 A1* | 3/2019 | Pace | H02K 16/00 |
| 2019/0097477 A1* | 3/2019 | Kellner | H02K 19/103 |
| 2019/0190328 A1* | 6/2019 | Seo | H02K 1/246 |
| 2019/0229568 A1* | 7/2019 | Toda | H02K 19/10 |
| 2019/0238013 A1* | 8/2019 | Matsumoto | H02K 1/246 |
| 2019/0238035 A1* | 8/2019 | Matsumoto | H02K 17/16 |
| 2020/0280224 A1* | 9/2020 | Huang | H02K 1/246 |
| 2020/0343798 A1* | 10/2020 | Takeuchi | H02K 19/14 |
| 2021/0091615 A1* | 3/2021 | Hu | B60K 1/00 |
| 2022/0173644 A1* | 6/2022 | Li | H02K 1/246 |
| 2022/0216776 A1* | 7/2022 | Hazeyama | H02K 19/103 |
| 2022/0224210 A1* | 7/2022 | Hu | H02K 15/0012 |
| 2022/0368183 A1* | 11/2022 | Reffo | H02K 1/279 |
| 2022/0407372 A1* | 12/2022 | Yen | H02K 19/103 |
| 2023/0120904 A1* | 4/2023 | Pagliaro | H02K 19/14 310/211 |
| 2023/0208222 A1* | 6/2023 | Karuzic | H02K 19/103 310/216.107 |
| 2023/0308001 A1* | 9/2023 | Hu | H02K 15/0012 |
| 2024/0030793 A1* | 1/2024 | Hu | H02K 21/46 |
| 2024/0072594 A1* | 2/2024 | Hamada | H02K 3/493 |

\* cited by examiner

SELF-STARTING RELUCTANCE MOTOR

This application is the National Phase of International Application PCT/IB2021/052210 filed Mar. 17, 2021 which designated the U.S.

This application claims priority to Italian Patent Application No. 102020000006052 filed Mar. 23, 2020, which applications are incorporated by reference herein.

TECHNICAL FIELD

This invention relates to a self-starting reluctance motor.

BACKGROUND ART

It is known from the scientific literature of the sector that this type of motor, although having higher efficiency than asynchronous motors in relation to the quantity of active material used (magnetic plate, copper wire, die-cast aluminium), has reduced performance levels during the start-up step and even more during the synchronising step; in particular, for these motors, with the same load resistance torque, the synchronisation capacity decreases with the increase in the inertia of the load.

The solutions currently adopted still do not guarantee satisfactory performance levels, for example, during the start-up phase, and even more so during the synchronising phase, that is to say, the passage from asynchronous to synchronous operation.

Moreover, a problem common to all the reluctance motors is linked to the so-called torque ripple, that is to say, to the oscillation of the output torque delivered by the motor, which can also be perceived acoustically during operation of the motor.

DISCLOSURE OF THE INVENTION

The aim of the invention is to provide a rotor for a self-starting reluctance motor and a motor equipped with the rotor which guarantees a correct start-up, substantially maintaining unaltered the efficiency under steady-state conditions.

Another aim of the invention is to provide a reluctance rotor which increases the synchronising capacity of the corresponding motor, without a significant degradation of the other steady-state performance levels, in particular the efficiency and the power factor.

Another aim of the invention is to provide a reluctance motor which reduces, and, possibly, annuls, the torque ripple at the output of the motor.

These aims and others, which are more apparent in the description which follows, are achieved by means of a rotor of a motor, and in general a synchronous self-starting reluctance motor, comprising the technical features described in one or more of the appended claims.

BRIEF DESCRIPTION OF DRAWINGS

The technical features of the invention, with reference to the above-mentioned aims, are clearly described in the claims below and its advantages are more apparent from the detailed description which follows, with reference to the accompanying drawings which illustrate a preferred, non-limiting embodiment of the invention by way of example and in which:

DETAILED DESCRIPTION OF PREFERRED EMBODIMENTS OF THE INVENTION

Figure 1:
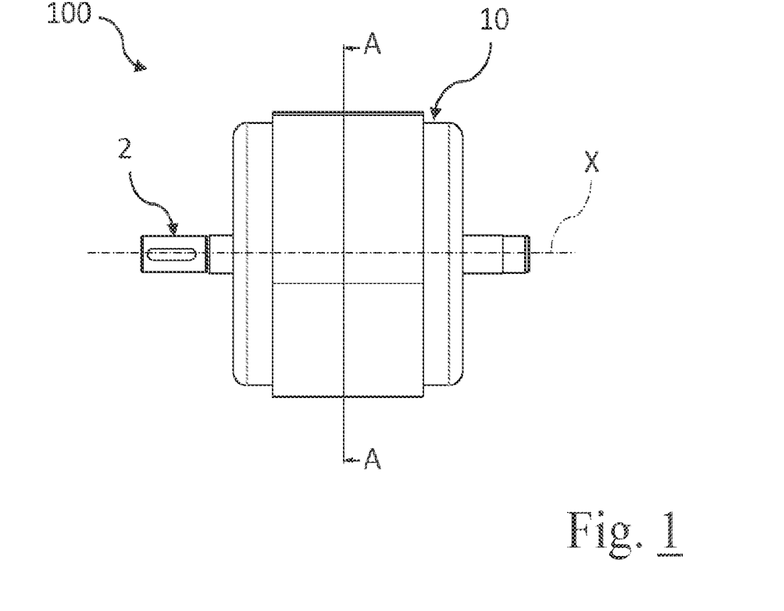
FIG. 1 is a side view of a self-starting reluctance motor according to the invention.
Figure 2:
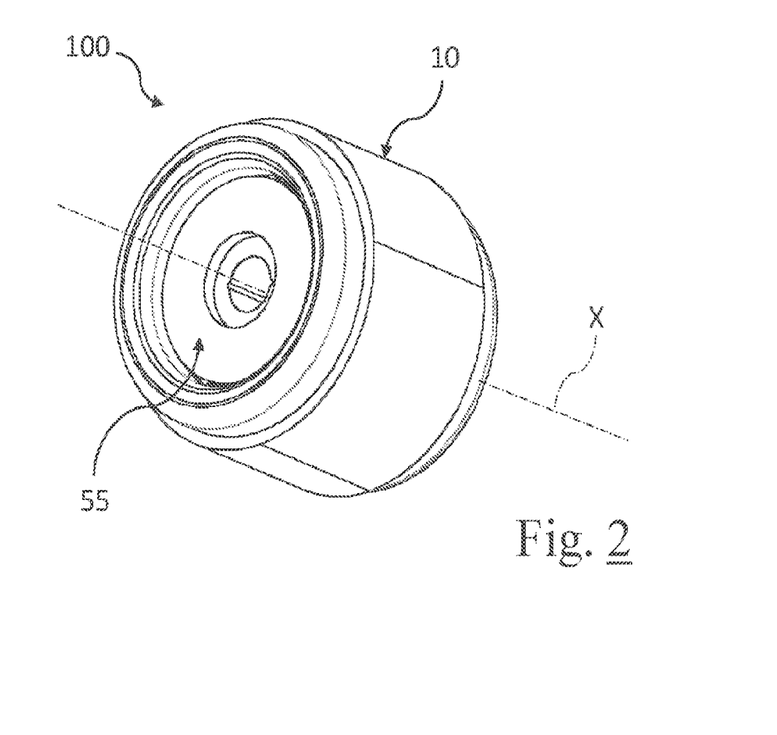
FIG. 2 is a perspective view of the self-starting reluctance motor of FIG. 1, with some parts cut away for greater clarity.

With reference in particular to FIGS. 1 and 2, the numeral 100 denotes a synchronous self-starting electric reluctance motor.

For simplicity, hereinafter in this description, the synchronous self-starting electric reluctance motor will only be referred to as motor 100.

As illustrated in FIG. 1, the motor 100 extends in the direction of the axis of rotation X.

Preferably, as illustrated in FIGS. 1 and 2, the motor 100 comprises a casing 10.

The casing 10 is configured to contain at least part of the components of the motor 100, which are described below.

Moreover, the casing 10 is configured to protect said at least part of the components of the motor 100.

Advantageously, the presence of the casing 10 obstructs the entry of dust or other materials into the motor 100, thus reducing the risk of faults and losses in performance.

In the embodiment shown in the accompanying drawings, the motor 100 is an electric motor with four magnetic poles.

Figure 3:
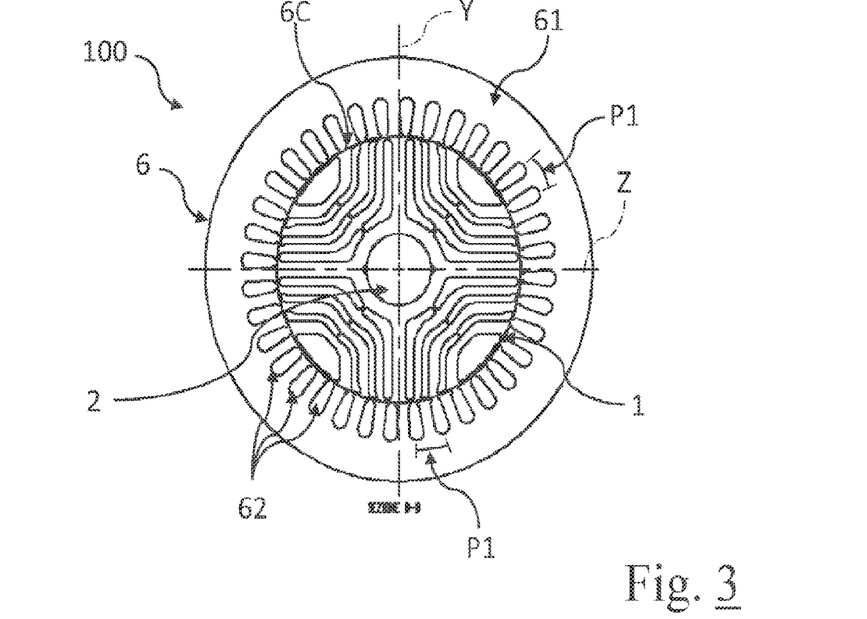
FIG. 3 is a front view, in cross section through the plane A-A, of the self-starting reluctance motor of FIG. 1.

As better illustrated in FIG. 3, the motor 100 comprises a rotor 1.

As illustrated in FIG. 1, the rotor 1 comprises a drive shaft 2.

Said drive shaft 2 and said rotor 1 rotate about an axis of rotation X.

Preferably, said axis of rotation X coincides with a longitudinal axis of the drive shaft 2.

Again preferably, the axis of rotation X coincides with a circular axis of symmetry of the motor 100.

The rotor 1 is mounted in an integral fashion with said drive shaft 2, that is to say, the rotor 1 comprises the drive shaft 2.

Preferably, the coupling between the drive shaft 2 and the rotor 1 is made by means of a shape coupling.

Figure 4:
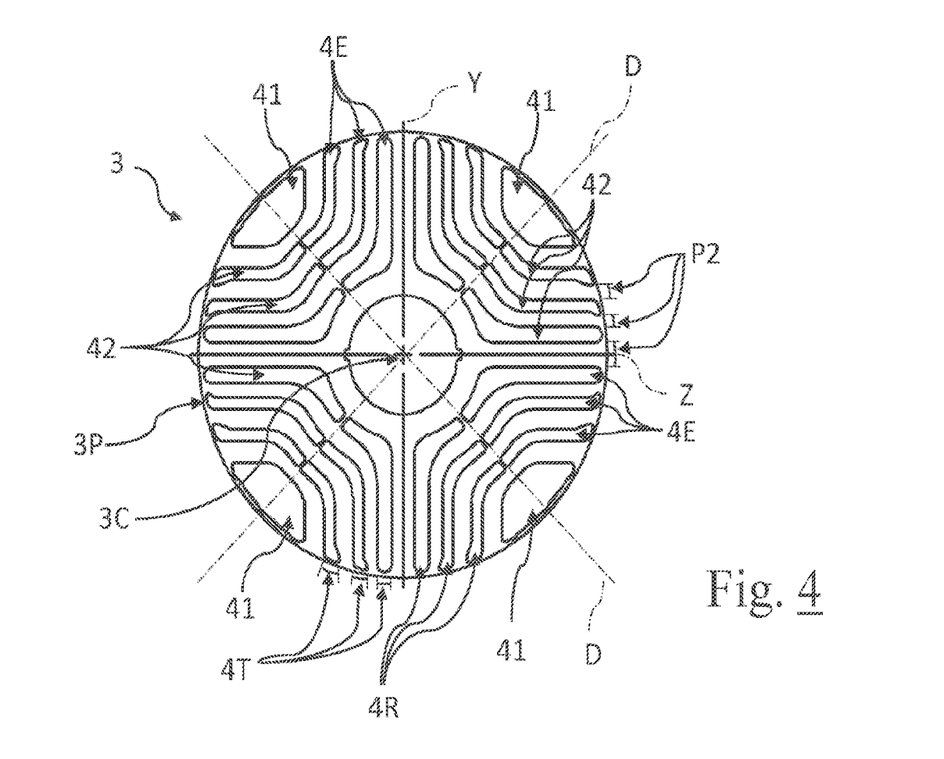
FIG. 4 illustrates an embodiment of the rotor plate of the self-starting reluctance motor of FIG. 1.

The rotor 1 comprises a plurality of annular rotor plates 3, illustrated by way of a non-limiting example in FIG. 4.

According to one aspect of the invention, each rotor plate has a plurality of openings 41, 42.

Preferably, the rotor plates 3 are identical to each other.

With the rotor 1 assembled, the rotor plates 3 are superposed along the axis of rotation X.

Preferably, the rotor 1 is obtained by superposing and assembling the plurality of rotor plates 3 using various techniques already available industrially.

The rotor plates 3 are made of ferromagnetic material.

According to one embodiment, the rotor plates 3 are assembled along the axis of rotation X with the respective plurality of openings 41, 42 substantially superposed on each other.

In this embodiment, the rotor 1 has a plurality of rotor slots extending substantially parallel to the axis of rotation X.

According to another embodiment, the rotor plates 3 are assembled along the axis of rotation X with the respective plurality of openings 41, 42 partly superposed on each other.

In other words, the adjacent rotor plates 3 are rotated by an angle such as to allow only partial superposing between the respective plurality of openings 41, 42, according to an architecture of the rotor commonly known as skewed.

According to this embodiment, the rotor 1 has a plurality of rotor slots extending in a substantially skew manner relative to the axis of rotation X.

According to one aspect of the invention, the plurality of openings 41, 42 comprises at least a pair of first openings 41.

Preferably, the number of pairs of first openings 41 is equal to half of the magnetic poles of the motor 100.

In the embodiment of the accompanying drawings, showing a motor with four magnetic poles, the rotor plates 3 each comprise two pairs of first openings 41, that is to say, four first openings.

Preferably, the first openings 41 are positioned close to an outer perimeter 3P of the respective rotor plate 3.

In other words, the first openings 41 are positioned in a peripheral portion of the rotor plate 3.

Preferably, the elements of each pair of first openings 41 are positioned on opposite sides of a centre 3C of the rotor plate 3, that is to say, they are diametrically opposite each other.

Again preferably, the first openings 41 are equispaced along a circular ring close to the outer perimeter 3P of the respective rotor plate 3.

According to this arrangement, it is possible to divide each rotor plate 3 into sectors 40, that is to say, portions of plate containing a single first opening 41.

Due to the circular shape of the rotor plates 3, the sectors 40 are segments of a circle, the line of which joining the centre of the first opening 41 and the centre 3C represents the bisector.

In the embodiment of FIGS. 3 and 4, the rotor plate 3 comprises four sectors 40 delimited by a first axis Y and a second axis Z.

In the view of FIGS. 3 and 4, the first axis Y and the second axis Z have, respectively, a vertical and horizontal direction, the first openings 41 are, on the other hand, in quadrature positions.

According to another aspect of this invention, each rotor plate 3 comprises, for each pair of first openings 41, a plurality of second openings 42.

Preferably, said second openings 42 are positioned symmetrically relative to a chord D, joining the elements of the respective pair of first openings 41.

The chord D passes through the centre 3C of the rotor plate 3.

Again preferably, said second openings 42 are positioned symmetrically relative to the centre 3C of the rotor plate 3.

In the embodiment of FIG. 4, the rotor plate 3 comprises twenty-eight second openings 42, twelve for each of the two pairs of first openings 41 and six for each of the four sectors 40.

Advantageously, the presence of the second openings 42 makes it possible to define flow barriers designed to constitute preferential paths of a magnetic field.

These flow barriers, if inserted in a variant magnetic field, generate a reluctance torque designed to rotate the rotor 1.

In this description, the central cavity of each rotor plate 3, constituting the housing cavity of the drive shaft 2, must not be considered to be included in the openings 41, 42.

Taken as a whole, the first openings 41 and second openings 42 occupy a first area A1, measured in a plane transversal to the axis of rotation X, coinciding with the plane of FIG. 4.

The rotor plate 3 covers a total area AT, also measured in a plane transversal to the axis of rotation X, coinciding with the plane of FIG. 4.

Said first area A1 and the total area AT are in relation to each other according to an active ratio R1.

More specifically, the active ratio R1 is equal to the ratio between the first area A1 and the total area AT, that is to say, R1=A1/AT.

According to one aspect of this invention, the active ratio R1 is greater than or equal to 0.30, that is to say, R1≥0.30.

According to one embodiment, the active ratio R1 is greater than or equal to 0.40, that is to say, R1≥0.40.

According to another embodiment, the active ratio R1 is less than or equal to 0.80, that is to say, R1≤0.80.

According to yet another embodiment, the active ratio R1 is less than or equal to 0.60, that is to say, R1≤0.60.

Preferably, the active ratio R1 is between 0.30 and 0.80 inclusive, that is to say, 0.30≤R1≤0.8.

Still more preferably, the active ratio R1 is between 0.40 and 0.60 inclusive, that is to say, 0.40≤R1≤0.60.

Figure 9:
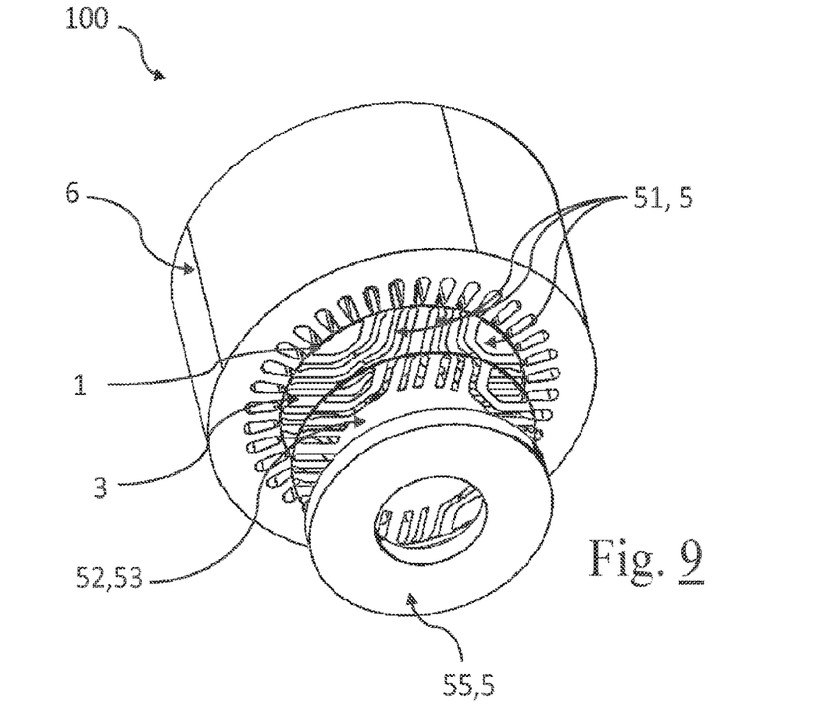
FIG. 9 is an exploded view of a detail of one embodiment of the reluctance motor of FIG. 1.
Figure 10:
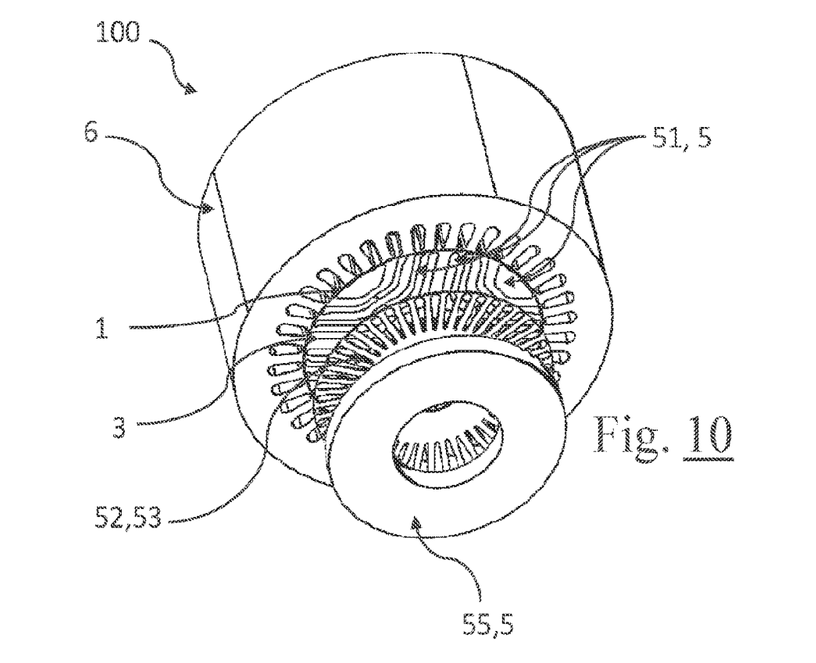
FIG. 10 is an exploded view of a detail of another embodiment of the reluctance motor of FIG. 1.

As illustrated in FIGS. 9 and 10, the rotor 1 comprises a squirrel cage type structure 5 to which reference will be made for practical purposes.

Said squirrel cage 5 comprises a plurality of bars 51.

The plurality of bars 51 passes through at least part of said plurality of openings 41, 42.

Advantageously, the presence of a squirrel cage 5 allows the motor 100 to rotate independently, that is to say, to rotate itself.

According to one embodiment, the plurality of bars 51 is made of aluminium or an aluminium alloy.

According to yet another embodiment, the plurality of bars 51 is made of copper or a copper alloy.

The plurality of bars 51 passes through at least part of said plurality of openings 41,42.

Preferably, the plurality of bars 51 is made by die-casting conductive material passing through the openings 41, 42 of the plurality of superposed rotor plates 3.

More specifically, the plurality of bars 51 of the squirrel cage 5 passes through all the first openings 41 and through at least part of the plurality of second openings 42 of the rotor plates 3 of the rotor 1.

Preferably, the number of openings 41, 42 occupied by the plurality of bars 51 of the squirrel cage 5 is greater than the number of openings 41, 42 left free, that is to say, occupied by air.

Advantageously, the presence of conductive material also in the second openings 42, and not only in the first openings 41 as in the prior art solutions, guarantees better performance during the transient step for reaching the synchronization speed of the synchronous motor.

Again as illustrated in FIGS. 9 and 10, the rotor 1 comprises a pair of closing plates 52, 53.

The closing plates 52, 53 are located along the axis of rotation X at the two ends of said plurality of rotor plates 3, so as to close the plurality of rotor plates 3 at the front and rear.

Preferably, the pair of closing plates 52, 53 are made of steel.

Preferably, the pair of closing plates 52, 53 comprises a blind inner ring 52A, 53A, that is to say, it does not have openings.

The inner ring 52A, 53A is concentric to the respective closing plate 52, 53.

More specifically, the inner ring 52A, 53A is located inside an intermediate circular boundary 5M, concentric with the closing plate 52, 53.

Preferably, the pair of closing plates 52, 53 comprises an outer ring 52B, 53B, concentric with the respective closing plate 52, 53.

More specifically, the outer ring 52B, 53B is located outside the inner ring 52A, 53A.

Figure 5:
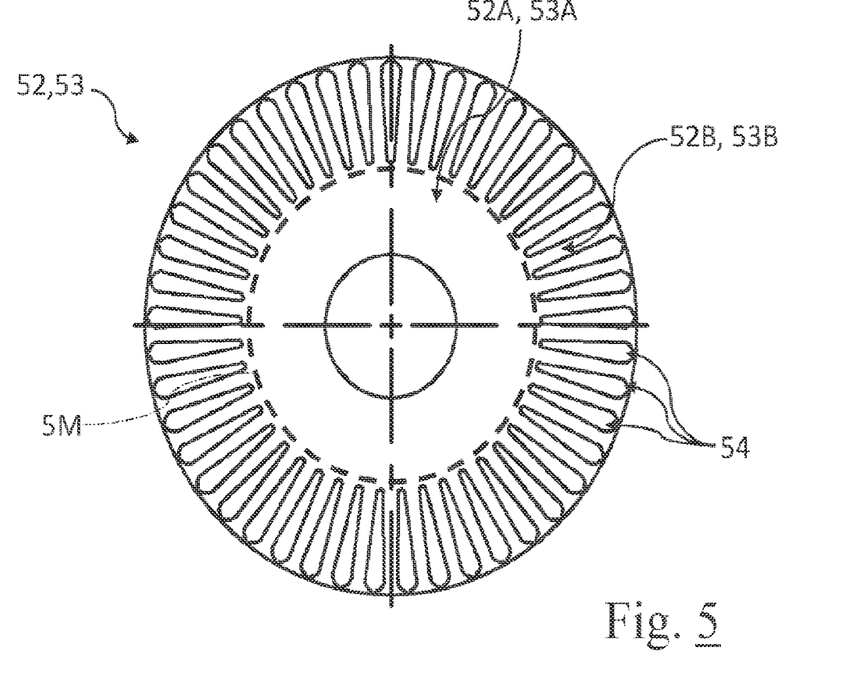
FIG. 5 is a front view of one of the possible embodiments for one of the two end plates of the self-starting reluctance motor which close the front and rear of the pack of rotor plates of FIG. 1.
Figure 7:
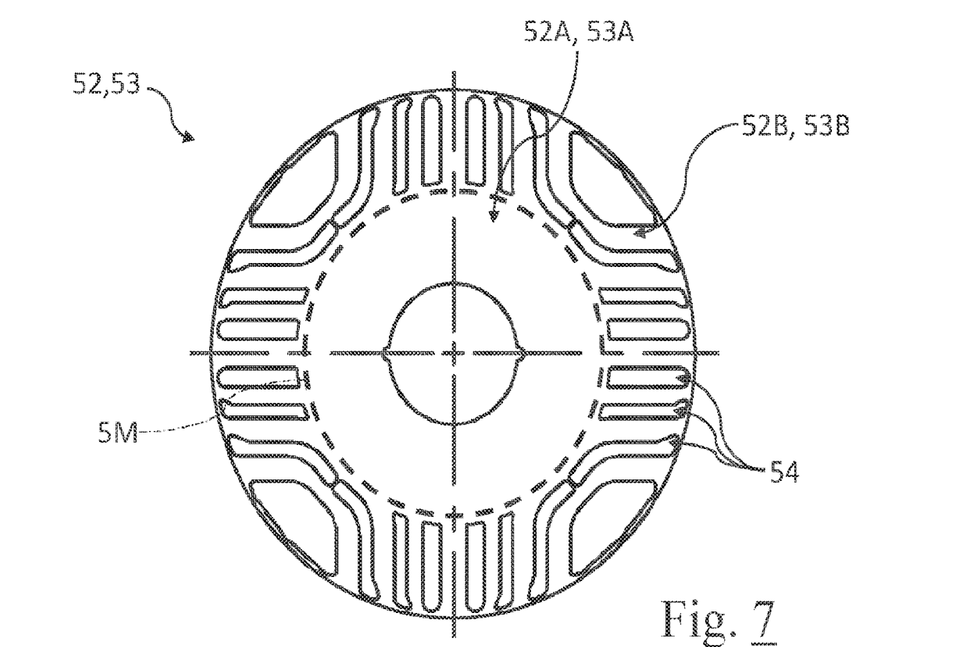
FIG. 7 is a front view of another embodiment for one of the two end plates of the self-starting reluctance motor which close the front and rear of the pack of rotor plates of FIG. 1.

More specifically, as illustrated in FIGS. 5 and 7, the outer ring 52B, 53B is located outside the intermediate circular boundary 5M.

Still more preferably, the outer ring 52B, 53B has a plurality of third openings 54.

According to one embodiment, illustrated in FIG. 5, the plurality of third openings 54 is positioned uniformly in the second portion 52B, 53B.

More specifically, in this embodiment, the plurality of third openings 54 is circularly equally spaced in the outer ring 52B, 53B of the pair of closing plates 52, 53.

In the embodiment of FIG. 5, the plurality of third openings 54 has a direction of extension radial to a centre of the respective plate of the pair of closing plates 52, 53.

It should be noted that in this embodiment said pair of closing plates 52, 53 consists of a pair of plates of the same type as plates used in asynchronous motors.

Advantageously, the positioning of a pair of closing plates 52, 53 similar to the plates used in asynchronous motors makes it possible to use the same die-casting tools used in asynchronous motors for creating bars 51 by injecting metal (e.g. aluminium) under pressure.

In this way, again advantageously, the design costs of a die-casting device suitable for the structure of the rotor plates 3 are annulled and the remaining plates are used, for example, from other productions (e.g. warehouse remnants) which would otherwise have to be disposed of.

Figure 6:
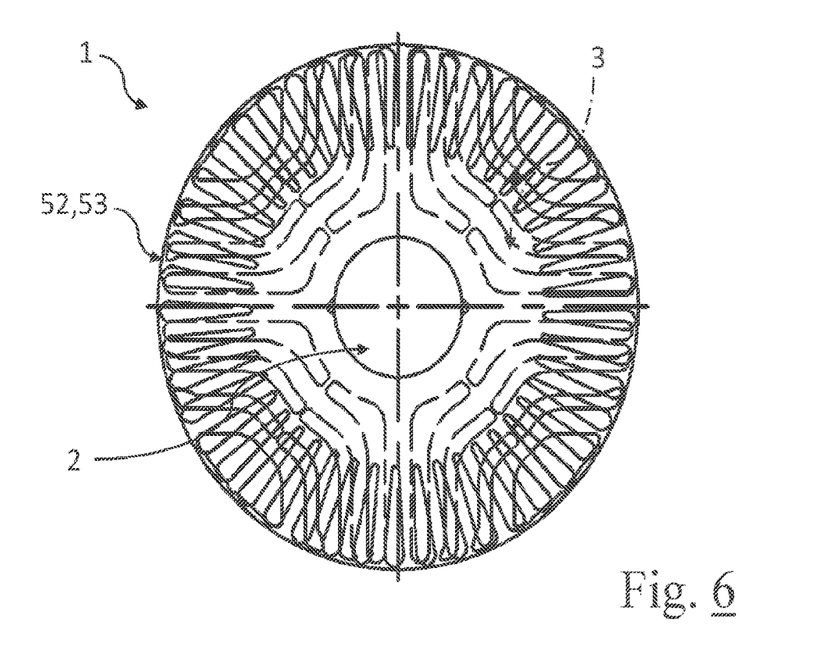
FIG. 6 is a front view of the superposing between the end plate of FIG. 5 and the rotor plate of FIG. 4 when the reluctance motor is assembled.

As illustrated in FIG. 6, which shows the closing plate 52, 53 of FIG. 5 superposed on a rotor plate 3, the blind inner ring 52A, 53A totally occludes the second openings 42 located in the inner region of the rotor plate 3, whilst the outer ring 52B, 53B occludes only partly the first openings 41 and the second openings 42 located in the peripheral region of the rotor plate.

According to another embodiment, illustrated in FIG. 7, the plurality of third openings 54 corresponds to the portion of first openings 41 and second openings 42 of the rotor plates 3 positioned, at least partly, in a portion of the rotor plate 3 corresponding to the outer ring 52B, 53B of the pair of closing plates 52, 53.

In other words, in this embodiment, the pair of closing plates 52, 53 is identical to the rotor plate 3 as regards the peripheral zone (that is, outside the circular intermediate boundary 5M), whilst the inner part is blind.

In this embodiment, although the arrangement of the third openings 54 of the pair of closing plates 52, 53 is not similar to that present in the plates of asynchronous motors, it is advantageously possible to use prior art die-casting tools for creating the bars 51 by injecting metal (e.g. aluminium) under pressure, avoiding the costs of a special design of a die-casting tool.

Figure 8:
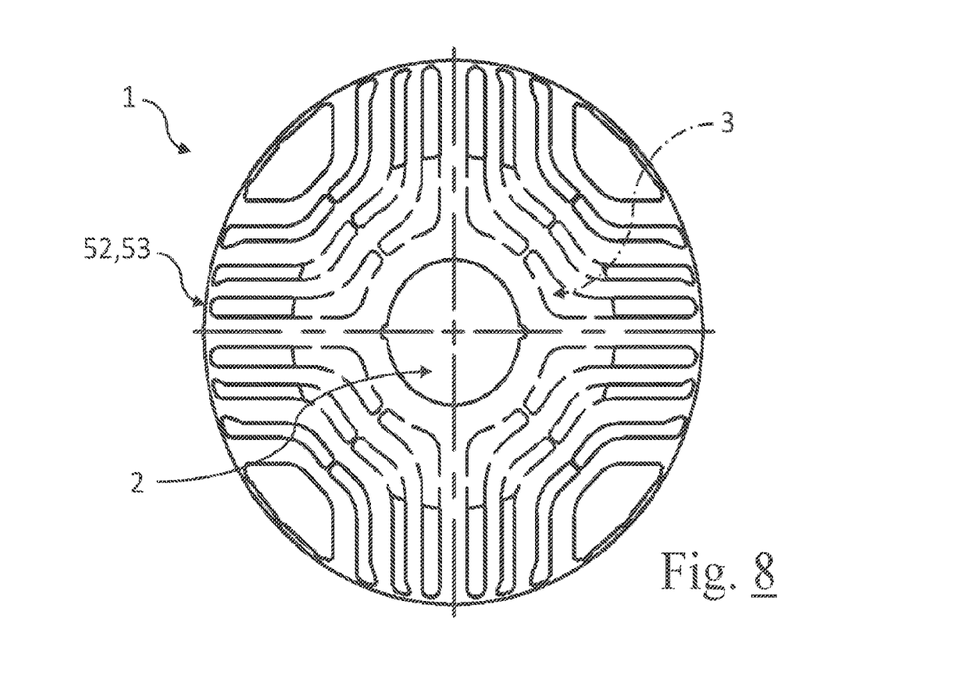
FIG. 8 is a front view of the superposing between the end plate of FIG. 7 and the rotor plate of FIG. 5 when the reluctance motor is assembled.

As illustrated in FIG. 8, which shows the closing plate 52, 53 of FIG. 7 superposed on a rotor plate 3, the blind inner ring 52A, 53A totally occludes the second openings 42 located in the inner region of the rotor plate 3, whilst the outer ring 52B, 53B occludes only partly the first openings 41 and the second openings 42 located in the peripheral region of the rotor plate.

Preferably, as illustrated in the embodiment in FIG. 8, the plurality of third openings 54 leaves the first openings 41 completely open and only partly occlude the second openings 42 of the rotor.

Again as illustrated in FIGS. 9 and 10, the squirrel cage 5 comprises a pair of short-circuit rings 55. The pair of short-circuit rings 55 is positioned along the axis of rotation X at the ends of said plurality of bars 51, outside the pair of closing plates 52,53, so as to form the structure typical of a squirrel cage for electric motors.

According to one embodiment, the pair of short-circuit rings 55 is made of aluminium or an aluminium alloy.

According to yet another embodiment, the pair of short-circuit rings 55 is made of copper or a copper alloy.

The pair of short-circuit rings 55 is configured for short-circuiting the plurality of bars 51 and therefore allowing the passage of current through the circuit consisting of the plurality of bars 51 and the pair of short-circuit rings 55.

It should be noted that although the pair of closing plates 52, 53 is interposed between the ends of the plurality of bars 51 and the pair of short-circuit rings 55, the presence of said closing plates 52, 53 is not such as to isolate them electrically and substantially does not interrupt the electrical flow between said plurality of bars 51 and the pair of short-circuit rings 55.

As illustrated in FIG. 3, the motor 100 comprises a stator 6.

The stator 6 is mounted about the rotor 1 in a static manner and coaxial with the axis of rotation X.

In order to house the rotor 1, the stator 6 has a cavity 6C, preferably over-sized relative to the rotor 1 to prevent contacts and friction during rotation of the rotor 1.

Preferably, the pair of closing plates 52, 53 and the pair of short-circuit rings 55 are not contained in the cavity 6C and do not contribute to the effective length of the rotor 1, that is to say, the component of said rotor which allows the rotation due to magnetic reluctance phenomena.

Like the rotor 1, the stator 6 also comprises a plurality of stator plates 61 which are identical to each other and superposed along the axis of rotation X.

Preferably, the stator 6 is obtained by superposing and assembling the plurality of stator plates 61 using industrial packing techniques.

According to one embodiment, the stator plates 61 are made of steel.

Each stator plate 6 comprises a plurality of fourth openings 62 which, in practice, are the stator slots between the stator teeth.

Said fourth openings 62 face the cavity 6C.

Preferably, said fourth openings 62 are positioned with a regular spacing P1 about the axis of rotation X.

In other words, the fourth openings 62 are circularly equispaced along a circumference whose centre coincides with the axis of rotation X and whose radius substantially coincides with the radius of the cavity 6C of the stator 6.

According to one embodiment, the stator plates 61 are assembled along the axis of rotation X with the fourth openings 62 substantially superposed on each other.

In this embodiment, the stator 6 has a plurality of stator slots extending substantially parallel to the axis of rotation X.

Preferably, at least part of the second openings 42 of the rotor plate 3 faces the outer perimeter 3P of the rotor plate 3 at a peripheral end 4E.

In other words, at least part of the second openings 42 extends until almost making contact, at least at one point, of the outer perimeter 3P with the relative end 4E.

Therefore, depending on the relative angular position of the rotor 1, a second opening 42 of the rotor plate 3 may, at its peripheral end 4E, face a fourth opening 62 of the rotor plate 61.

Preferably, the number of peripheral ends 4E of each rotor plate 3 is less than the number of fourth openings 62 of the rotor plate 61.

If, in certain angular positions of the rotor 1, the arrangement of the second openings 42 of the rotor plate 3 is such that all the peripheral ends 4E correspond to at least part of the fourth openings 62 of the rotor plate 61 there would be problems linked to torque ripple, that is to say, to the oscillation of the output torque dispensed by the motor.

Preferably, each peripheral end 4E is at a distance from an adjacent peripheral end 4E equal to an arc of circumference P2, measured along the outer perimeter 3P of the rotor plate 3.

Again preferably, said arc of circumference P2 is not constant for each pair of peripheral ends 4E and is not a multiple of the regular spacing P1 between the fourth openings 62.

Advantageously, in this way the circumstance is avoided in which all the peripheral ends 4E of the rotor plate 3 are facing the fourth openings 62 of the stator plate 61 and the torque ripple of the motor 100 is reduced.

Preferably, the adjacent peripheral ends 4E have an extension 4T variable in a direction tangential to the outer perimeter 3P of the rotor plate 3.

Again preferably, as illustrated in FIG. 4, the second openings 42 have, at their peripheral end 4E, an enlargement 4R.

In other words, the second openings 42 have, at their peripheral end 4E, a portion having a dimension, measured along the first axis Y or the second axis Z, greater than the remaining portion of the second opening 42, in particular relative to the portion close to the peripheral end 4E.

In that way, thanks to the presence of the enlargement 4R and the variable distance P2 between the peripheral ends 4E, the number of peripheral ends 4E facing the fourth openings 62 is kept substantially constant at each angular position of the rotor 1, and the torque ripple of the motor 100 is further reduced.

The rotor 1 and the motor 100 according to the invention achieve the preset aims and brings important advantages.

A first advantage connected to the rotor 1 and to the motor 100 is that of providing a self-starting reluctance electric motor which has good performance levels during the start-up phase, substantially maintaining unaltered the performance under steady-state conditions.

The motor 100 adds, to the known steady-state performance levels of a traditional reluctance electric motor, an efficiency in the start-up phase which cannot be found in the prior art self-starting reluctance motors.

Moreover, thanks to the distribution of the openings on the plates of the rotor 1, especially in the peripheral portions, the motor 100 considerably reduces the torque ripple at the output from the motor.

Each individual rotor plate has a series of openings, so-called "flow barriers", whose structure is repeated symmetrically about the axis of rotation with a number equal to the number of poles of the motor. The purpose of these openings is to channel the magnetic flow of the motor in such a way that it can follow "favourable" paths (low reluctance paths). Each low reluctance path is separated from the next path by an "unfavourable" path (high reluctance), which is the path which, virtually, passes through the flow barriers.

The flow barriers are filled completely with non-ferromagnetic material but with a good conduction such as aluminium or die-cast copper, and closed at the front and rear by a ring made of the same material for closing the electrical circuit, similarly to what occurs in the asynchronous squirrel cage motors. In this way it is possible to generate a start-up torque and change the motor to a speed close to synchronous speed, after which the synchronising process starts, that is to say, the passage from asynchronous to synchronous operation.

To allow a good synchronising capacity, the ratio between the total cross-section of the flow barriers and the total cross-section of the rotor is preferably greater than 0.30.

In order to contain the die-cast aluminium and at the same time allow the use of the same die-casting moulds in use on asynchronous motors of normal production, in which the rotor slots are positioned towards the outer part of the rotor, at the head and at the rear of the rotor pack a "blind" plate added in the inner part, which may have towards the outer part the same geometry as the one which forms the pack, or be directly a normal asynchronous rotor plate in use for that size of motor.

In order to reduce the undulation torque (ripple), the barriers have an enlargement at the end which makes it possible to reduce the magnetic anisotropy in the air gap zone due to the interaction between the stator slots and the rotor flow barriers.

The invention claimed is:

1. A rotor for an electric motor comprising:
    a drive shaft having an axis of rotation;
    a plurality of annular rotor plates, preferably identical to each other, mounted on the drive shaft and superposed along the axis of rotation, each rotor plate having a plurality of openings, the openings of adjacent rotor plates being at least partly aligned along a direction parallel to the axis of rotation; said rotor comprising
    a pair of closing plates located along the axis of rotation at the ends of said plurality of rotor plates;
    a plurality of bars, passing through at least part of said plurality of openings;
    a pair of short-circuit rings located along the axis of rotation at the ends of said plurality of bars, externally to the pair of closing plates;
    each rotor plate being characterized in that an active ratio between a first area occupied by the plurality of openings and a total area of the rotor plate is greater than or equal to 0.30.

2. The rotor according to claim 1, wherein the plurality of openings comprises at least one pair of first openings, positioned close to an outer perimeter of the rotor plate, the elements of each pair of first openings being positioned symmetrically relative to a centre of the rotor plate.

3. The rotor according to claim 2, wherein the plurality of openings comprises, for each pair of first openings, a plurality of second openings positioned symmetrically relative to a chord joining the elements of the respective pair of first openings and relative to said centre of the rotor plate.

4. The rotor according to claim 3, wherein the plurality of third openings corresponds to the portion of first openings and second openings of the rotor plates positioned, at least partly, in a portion of the rotor plate corresponding to the outer ring of the pair of closing plates.

5. The rotor according to claim 3, wherein the plurality of bars passes through the first openings and through at least part of the plurality of second openings.

6. The rotor according to claim 3, wherein at least part of the second openings extends, at least at one peripheral end, up to the outer perimeter of the respective rotor plate, without contact of said outer perimeter.

7. The rotor according to claim 6, wherein the adjacent peripheral ends have an extension variable in a direction tangential to the outer perimeter of the rotor plate.

8. The rotor according to claim 1, wherein the pair of closing plates comprises a blind inner ring, concentric with the respective closing plate, and an outer ring having a plurality of third openings, said outer ring being positioned outside said inner ring and being concentric to the respective closing plate.

9. The rotor according to claim 8, wherein the plurality of third openings is positioned in a uniform fashion in the outer ring.

10. The rotor according to claim 1, wherein the active ratio is greater than or equal to 0.40, that is to say, $R1 \geq 0.40$.

11. The rotor according to claim 1, wherein the active ratio is at the same time less than or equal to 0.80, that is to say, $0.30 \leq R1 \leq 0.8$.

12. The rotor according to claim 1, wherein the active ratio is at the same time less than or equal to 0.60, that is to say, $0.30 \leq R1 \leq 0.6$.

13. A self-starting synchronous reluctance motor comprising:
  a rotor according to claim 1;
  a stator, mounted about the rotor in a static fashion and coaxial with the axis of rotation, having a cavity in which the rotor is housed.

14. The motor according to claim 13, wherein the stator comprises a plurality of annular stator plates, identical to each other and superposed along the axis of rotation, each stator plate comprising a plurality of fourth openings, facing the cavity when the motor is assembled and positioned with a regular spacing about the axis of rotation.

15. The motor according to claim 14, wherein an arc od circumference, measured along the outer perimeter, between a peripheral end and an adjacent peripheral end is not constant and is not a multiple of the regular spacing between the fourth openings.

* * * * *